(12) United States Patent
Kenny et al.

(10) Patent No.: US 9,064,304 B2
(45) Date of Patent: Jun. 23, 2015

(54) IMAGE QUALITY ASSESSMENT OF MICROSCOPY IMAGES

(71) Applicant: General Electric Company, Schenectady, NY (US)

(72) Inventors: Kevin Bernard Kenny, Niskayuna, NY (US); Megan Pearl Rothney, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 180 days.

(21) Appl. No.: 13/846,447

(22) Filed: Mar. 18, 2013

(65) Prior Publication Data

US 2014/0270425 A1    Sep. 18, 2014

(51) Int. Cl.
*G06T 7/00* (2006.01)

(52) U.S. Cl.
CPC ............ *G06T 7/0012* (2013.01); *G06T 7/0036* (2013.01); *G06T 2200/32* (2013.01); *G06T 2207/30024* (2013.01); *G06T 2207/30072* (2013.01)

(58) Field of Classification Search
USPC .................................. 382/128–134, 254–308
See application file for complete search history.

(56) References Cited

U.S. PATENT DOCUMENTS

| | | | |
|---|---|---|---|
| 6,165,374 A | 12/2000 | Cathey et al. | |
| 6,215,892 B1 | 4/2001 | Douglass et al. | |
| 7,266,235 B2 | 9/2007 | Hiroi et al. | |
| 7,490,085 B2 | 2/2009 | Walker et al. | |
| 7,709,222 B2 | 5/2010 | Rimm et al. | |
| 7,873,480 B2 | 1/2011 | Rimm et al. | |
| 8,121,794 B2 | 2/2012 | Rimm et al. | |
| 8,131,476 B2 | 3/2012 | Cline et al. | |
| 8,396,269 B2 | 3/2013 | Henderson et al. | |
| 2004/0122787 A1 | 6/2004 | Avinash et al. | |
| 2004/0218815 A1 | 11/2004 | Iizuka | |
| 2006/0120583 A1* | 6/2006 | Dewaele .................... 382/128 |
| 2009/0245610 A1 | 10/2009 | Can et al. | |
| 2009/0247416 A1* | 10/2009 | Can et al. .................... 506/7 |
| 2009/0324135 A1* | 12/2009 | Kondo et al. ............... 382/284 |
| 2010/0149183 A1 | 6/2010 | Loewke et al. | |
| 2010/0215227 A1* | 8/2010 | Grunkin et al. ............ 382/128 |
| 2011/0115896 A1 | 5/2011 | Doehring et al. | |
| 2011/0249910 A1 | 10/2011 | Henderson et al. | |
| 2012/0307000 A1* | 12/2012 | Doepke et al. .............. 348/36 |
| 2014/0270425 A1* | 9/2014 | Kenny et al. ............... 382/128 |

FOREIGN PATENT DOCUMENTS

| | | |
|---|---|---|
| GB | 2354131 A | 3/2001 |
| JP | 2004286584 A | 10/2004 |

OTHER PUBLICATIONS

Castro, Registration of Translated and Rotated Images Using Finite Fourier Transforms, 1987, IEEE.*
Srinivasa Reddy, et al., "An FFT-Based Technique for Translation, Rotation, and Scale-Invariant Image Registration", IEEE Transactions on Image Processing, vol. 5, No. 8, Aug. 1, 1996.
PCT Invitation to Pay Additional Fees from corresponding PCT Application No. PCT/US2014/030972 dated Jun. 11, 2014.
Kaynig et al., "Probabilistic Image Registration and Anomaly Detection by Nonlinear Warping", Computer Vision and Pattern Recognition, pp. 1-8, Jun. 2008.

* cited by examiner

*Primary Examiner* — Alex Liew
(74) *Attorney, Agent, or Firm* — Ellen B. Gallagher (57) ABSTRACT

Automated assessment of registration quality, focus, and area defects in sequentially acquired images, such as images acquired by a digital microscope, is disclosed. In one embodiment, acquired images are registered and whole-image defects are automatically detected based on a figure of merit generated by the registration process. In related implementations, area defects may be automatically detected by calculating correlations in localized image regions for images acquired in different imaging rounds.

11 Claims, 7 Drawing Sheets

IMAGE QUALITY ASSESSMENT OF MICROSCOPY IMAGES

BACKGROUND

The subject matter disclosed herein relates to the assessing the quality of microscopy images.

For various physiological conditions, such as cancer, infectious diseases, physiological disorders, and so forth, detection and monitoring may be based, in part, on the analysis of a biological specimen from the patient. For example, a sample may be analyzed to detect the presence of abnormal numbers or types of cells and/or organisms that may be indicative of a disease or disorder. Various types of microscopy may be employed for such analysis. Further, various stains and staining protocols may be employed as part of this analysis to allow visualization of different structures, chemicals, or environments that might aid in detection or diagnosis of a disease or disorder.

To facilitate analysis of such pathology or histology samples, automated microscopy systems have been developed that automate various aspects of the image acquisition process. In particular, digital optical microscopes may be used in such automated systems and provide a digital image output for each acquisition. Certain such systems employ scanning microscopes where a sequence of displaced images are acquired and associated together (e.g., "tiled" or "stitched" together) to form a composite of the sample region of interest. For example, in the context of pathology and histology imaging operations, tissue sample slides may undergo imaging to acquire digital images of small adjacent or overlapping areas at high magnification and/or resolution. The adjacent or overlapping images may then be joined or associated to form a larger image that may be navigated on a digital display device. In this manner, a composite or mosaic image of the sample may be generated, displayed, and navigated by a reviewer.

In certain instances, a series of images (e.g., immunohistochemical images) may be acquired of the same sample using different biomarkers on the histologic sample of tissue for each round of imaging. For example, one such technique works on a principle of serial staining where directly labeled fluorescent antibodies are applied to the tissue, images are acquired in several fluorescence channels, and the fluorescent labels on the antibodies are then extinguished by a chemical bleaching process. The process of staining, imaging and bleaching can be repeated dozens of times, yielding images of perhaps fifty or a hundred biomarkers in the same tissue sample.

However, the capability of acquiring imagery for a large number of biomarkers results in a large number of images being acquired. For example, a study of twenty biomarkers for thirty fields of view acquired for samples from a hundred patients will yield sixty thousand images. As will be appreciated, some of these images will have technical faults or other defects and visual examination of the images for common faults may be an extremely laborious process.

BRIEF DESCRIPTION

In one embodiment, a computer-implemented method for assessing image quality is provided. The method includes the act of acquiring a first image and a second image. At least a portion of the first image and the second image overlap. A rotation and a scale are determined relating the first image and the second image. A respective Fourier transform of the first image is rotated and scaled to correspond to a respective Fourier transform of the second image. A translation for the respective first image and the second image is determined based upon the rotated and scaled Fourier transforms of the first image and the second image. A score quantifying the quality of the registration of the first image and the second image is determined.

In a further embodiment, an image analysis system is provided. The image analysis system includes a memory storing one or more routines and a processing component configured to execute the one or more routines stored in the memory. The one or more routines, when executed by the processing component, cause acts to be performed comprising: acquiring or accessing a first image and a second image, wherein at least a portion of the first image and the second image overlap; determining a rotation and a scale relating the first image and the second image; rotating and scaling a respective Fourier transform of the first image to correspond to a respective Fourier transform of the second image; determining a translation for the respective first image and the second image based upon the rotated and scaled Fourier transforms of the first image and the second image; and determining a score quantifying the quality of the registration of the first image and the second image.

In an additional embodiment, a computer-implemented method for detecting area defects is provided. The method includes the act of, for each pixel in a first image, determining a comparison region. A correlation is performed between each comparison region and a corresponding region of a second image. A score is generated for each pixel in the first image based on the respective correlation between the respective comparison region associated with each pixel and the corresponding region of the second image. The score for each pixel corresponds to a likelihood of a defect within the first image at the respective pixel.

In another embodiment, an image analysis system is provided. The image analysis system includes a memory storing one or more routines and a processing component configured to execute the one or more routines stored in the memory. The one or more routines, when executed by the processing component, cause acts to be performed comprising: for each pixel in a first image, determining a comparison region; performing a correlation between each comparison region and a corresponding region of a second image; and generating a score for each pixel in the first image based on the respective correlation between the respective comparison region associated with each pixel and the corresponding region of the second image. The score for each pixel corresponds to a likelihood of a defect within the first image at the respective pixel

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The large number of images produced by automated, multiplexed scanning devices (such as may be used in immunohistochemical studies) makes manual detection of imaging failures—both gross failures of focus and position, and partial-image artifacts such as damaged tissue and foreign objects—difficult, if not infeasible. As such, it may be desirable to automate the detection of imaging failures. With this in mind, the present approach describes a receiver pipeline that, in one embodiment, registers images using rigid-body transformations in the Fourier domain, detects whole-image defects based on the figure of merit from the registration operation, and detects partial-image defects by calculating correlation in local regions of the image. As discussed herein, in accordance with the present approach, the most common problems with the images can be identified by automatic examination. Defective images (or parts of images) can then be excluded from statistical analysis to avoid contaminating the data with outliers. Receiver operating characteristic (ROC) studies have also been conducted that demonstrate that the disclosed algorithm is sufficiently robust to contemplate using it as an unsupervised classifier to discard bad data prior to quantitation.

Figure 1:
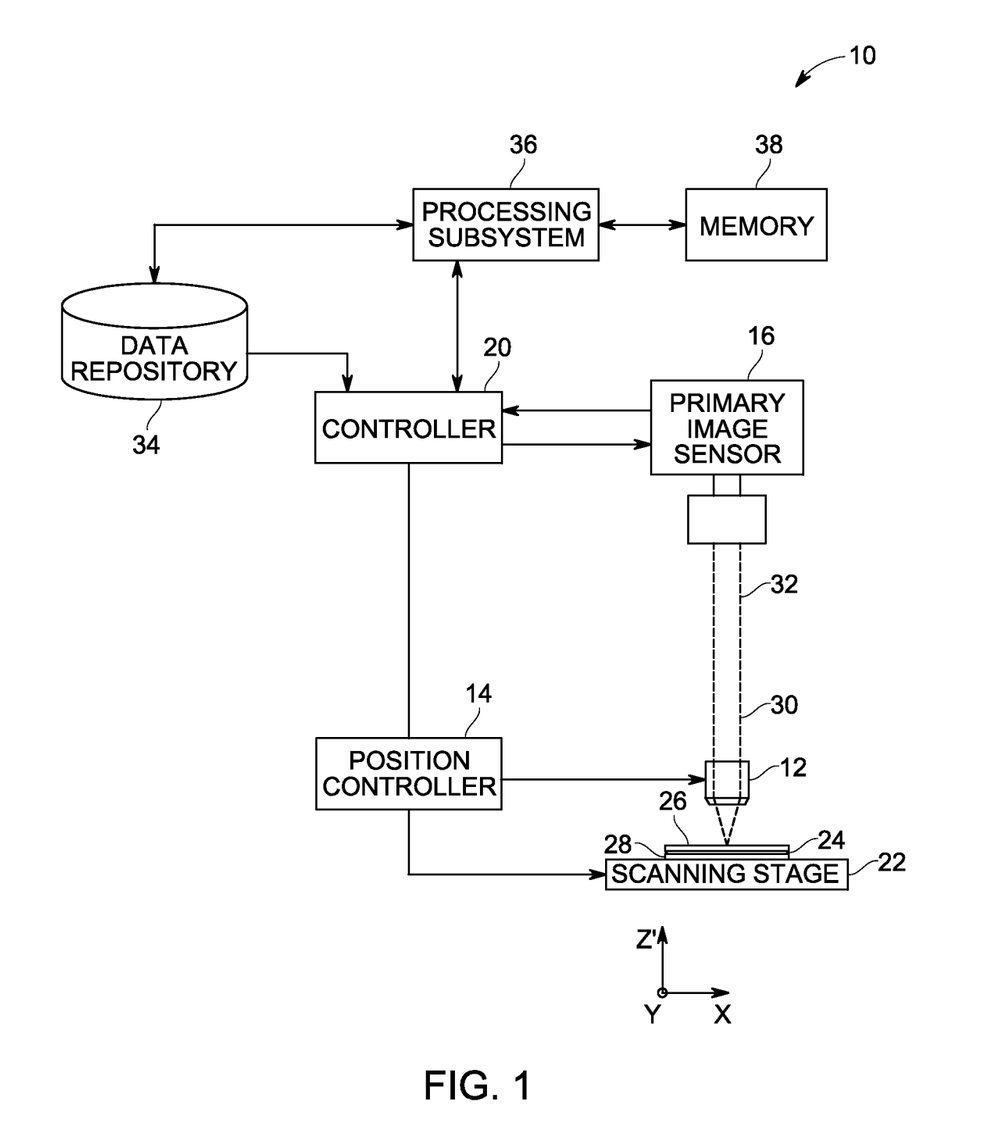
FIG. 1 is a block diagram of an imaging system, such as a digital optical microscope system, in accordance with aspects of the present disclosure.

With the preceding discussion in mind, FIG. 1 illustrates an embodiment of an imaging system 10, such as a digital optical microscope, that may be used in accordance with aspects of the present disclosure. The depicted imaging system 10 includes an objective lens 12, an image sensor 16, a controller 20 and a scanning stage 22. In the depicted embodiment, a sample 24 is disposed between a cover slip 26 and a slide 28. The sample 24, the cover slip 26, and the slide 28 positioned on the scanning stage 22. The cover slip 26 and the slide 28 may be made of a transparent material such as glass. In certain embodiments, the imaging system 10 may be part of an automated slide scanning system and may include an automatic slide feeder capable of feeding and loading slides for imaging one at a time from a magazine.

In certain embodiments, the sample 24 may be a biological sample, such as a tissue sample for analysis using pathology or histology techniques. In other instances, the sample 24 may be an industrial object, such as integrated circuit chips or microelectromechanical systems (MEMS). By way of example, such samples may have a thickness that averages from about 5 microns to about 7 microns and may vary by several microns. Examples of such samples may also have a lateral surface area of approximately 15 mm×15 mm.

In practice, the objective lens 12 is separated from the sample 24 along an optical axis in the Z (vertical) direction and has a focal plane in the X-Y plane coplanar with the slide 28. The objective lens 12 collects light 30 transmitted or reflected by the sample 24 at a particular field of view and directs the light 30 to an image sensor 16. As used herein, the term "light" encompasses any specified wavelength or range of wavelengths (i.e., spectrum) of interest for an imaging operation, whether visible to the human eye or otherwise. In one embodiment, the image sensor 16 generates one or more images of the sample 24 corresponding to a respective field of view at the time the image is acquired based on a primary light path 32. In certain embodiments, the image sensor 16 may be any suitable digital imaging device, such as a commercially available charge-coupled device (CCD) based image sensor.

The objective lens 12 employed in the system 10 may vary in magnification power based on considerations such as the application and the size of the sample features to be imaged. In one embodiment the objective lens 12 may be a high power objective lens providing a 20× or greater magnification and a having a numerical aperture of 0.5 or greater than 0.5 (small depth of focus). As will be appreciated, in other embodiments, the objective lens 12 may provide a different degree of magnification and/or may have a larger or smaller numerical aperture. By way of example, in one embodiment the objective lens 12 may be spaced from the sample 24 in the Z-direction by a distance ranging from about 200 microns to about a few millimeters and may collect light 30 from a field of view of 750μ×750μ in the focal plane. As will be appreciated, depending on the application, the working distance, the field of view, and the focal plane may vary depending upon the configuration of the system 10 and/or the characteristics of the sample 24 to be imaged. Further, as discussed herein, in embodiments where aspects of the imaging process are automated, such as to allow sequential acquisition of multiple images with respect to a sample 24, the system 10 may include a position controller 14, such as a piezo actuator, to provide fine motor control and rapid small field of view adjustment to the objective 12 and/or to adjust the position of the slide 28 or the scanning stage 22 on which the slide 28 is positioned.

Depending on the imaging protocol or application, the imaging system 10 may illuminate the sample 24 using one or more of a wide variety of imaging modes, including bright field, phase contrast, differential interference contrast and fluorescence. Thus, the light 30 may be transmitted or reflected from the sample 24 in bright field, phase contrast or differential interference contrast applications, or the light 30 may be emitted from the sample 24 (fluorescently labeled or intrinsic) fluorescence imaging applications. Further, the light 30 may be provided using trans-illumination (where a light source and the objective lens 12 are on opposite sides of the sample 24) or epi-illumination (where a light source and the objective lens 12 are on the same side of the sample 24). Therefore, as will be appreciated, the imaging system 10 may include a light source (such as a high intensity LED or a mercury or xenon arc or metal halide lamp) in certain embodiments.

As noted above, in one embodiment the imaging system 10 may be configured as a high-speed imaging system. Such a high-speed system may be configured to rapidly capture a large number of digital images of the sample 24, each image corresponding to a particular field of view of the sample 24. In certain applications, the particular field of view associated with an image may be representative of only a limited fraction of the entire sample 24. Further, the respective fields of view associated with a sequence of images may be adjacent to one another or may overlap one another. In an example of such an embodiment, the slide 28 is imaged repeatedly in adjacent or overlapping areas or is passed in a scanning sweep through the image acquisition area, i.e., field of view. In one such embodiment, an image is acquired, the stage 22 is advanced in the X and Y direction to a position in which an adjacent or overlapping area is moved into the field of view, and another image is acquired.

Further, as discussed herein, a set of the digital images associated with a particular acquisition sequence (such as a series of images acquired while the sample 24 is stained with a given stain) may be digitally combined or stitched together to form a digital representation of the entire sample 24, i.e., a composite or mosaic image or canvas. In one embodiment, the imaging system 10 may store the plurality of acquired images, as well as any composite or mosaic images generated using the acquired images, in a data repository 34 and/or memory 38.

As depicted in the present embodiment, the imaging system 10 may also include an exemplary processing subsystem 36 that may facilitate the execution of an automated imaging protocol and/or the processing of image data acquired by the imaging system 10. For example, the processing subsystem 36 may be configured to synthesize a composite image based upon a series of acquired images and to perform a referencing or registration operation with respect to other images or composite images generated for the same sample 24, such as after the sample 24 has been stained with a different compound. The processing subsystem 36 may also communicate with a display device (i.e., a screen or monitor) to cause the display of the acquired images or a composite image generated using the acquired images. Although the memory 38 is shown as being separate from the processing subsystem 36 in the depicted example, in certain embodiments the processing subsystem 36 and memory 38 may be provided together, i.e., as a single or coextensive component. Additionally, although the present example depicts the processing subsystem 36 as being a separate component from the controller 20, in other embodiments, the processing subsystem 36 may be combined with the controller 20 or may function as the controller 20.

Further, it should also be appreciated that in certain embodiments the imaging system 10 may be used to determine a quantitative characteristic with respect to the plurality of acquired images of the sample 24 captured at different times or imaging rounds or, otherwise, in different images. In certain contexts, such a figure of merit, as discussed herein may be used as an indication of registration or focus quality, and may thus be used to determine if a field of view image should be reacquired (such as using a different auto-focus algorithm) or if additional field of view images are needed to achieve an acceptable registration.

Figure 2:
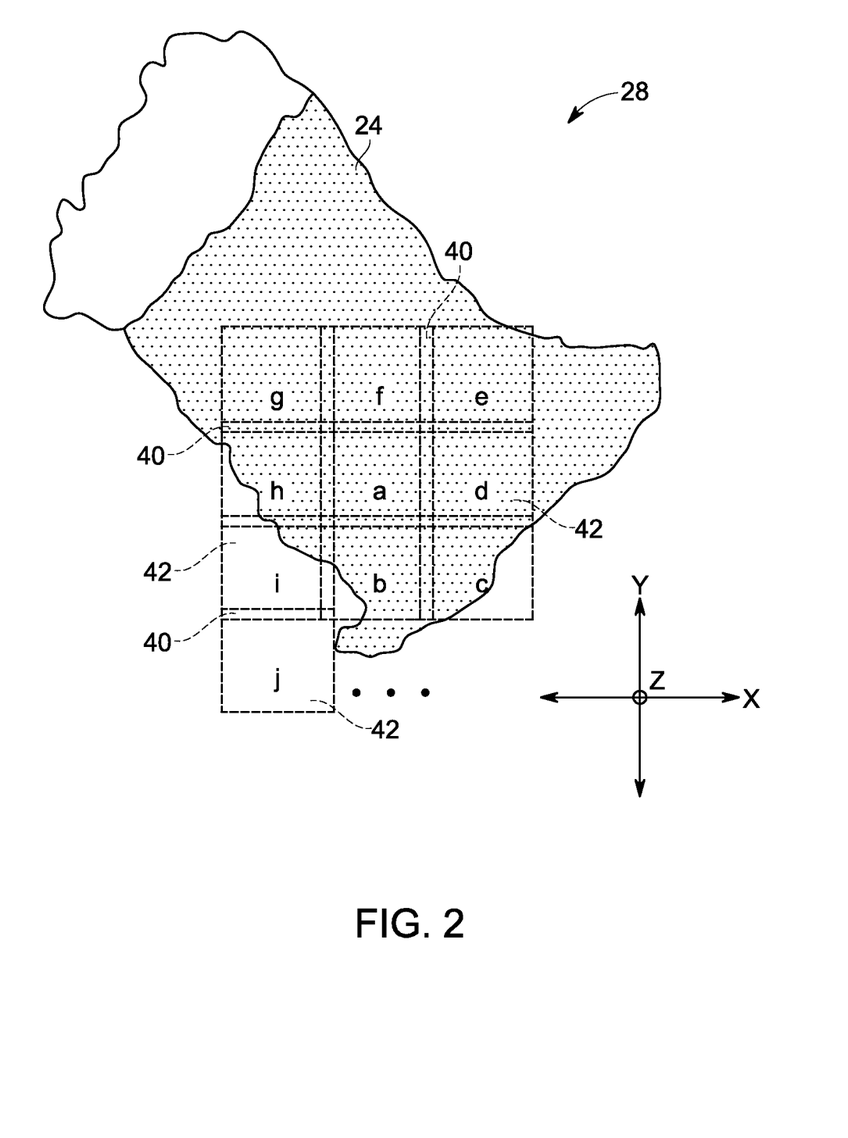
FIG. 2 is a plan view of a slide on which a sample is disposed with overlapping image areas where separate, overlapping field of view images may be acquired, in accordance with aspects of the present disclosure.

With the foregoing in mind, FIG. 2 depicts a sample 24 on a slide 28 undergoing an image acquisition using an imaging system 10 as discussed with respect to FIG. 1. In this example, a grid or array of images 42 are acquired for a set of overlapping fields of view, with each image 42 corresponding to a discrete image acquisition at a particular set of slide coordinates. Between each image acquisition, one or both of the slide 28 or the imaging objective are moved to allow image acquisition at the next slide location. In the example depicted in FIG. 2, the respective images 42 overlap one another at one or more edges 40. The overlapping at the edges 40 of the images 42 allows registration of the images 42, as discussed herein, to generate a composite or mosaic image.

As noted herein, issues may arise in certain imaging contexts where the slide 28 is periodically removed from the scanning stage 22 and replaced as part of a multi-image acquisition protocol. By way of example, such issues may arise in histology or pathology contexts where a given sample 24 undergoes multiple staining operations, with images being acquired of the sample 24 after each application of a new stain or set of stains. For example, in applications where the spatial distribution of biomarkers is profiled in a biological sample, a multi-step process may be employed, as depicted in the flow chart 48 of FIG. 3. In such an example, a slide 28 having a sample 24 is initially stained (block 50) with one or more agents (such as one or more fluorescently labeled agents that label specific biomarkers).

Figure 3:
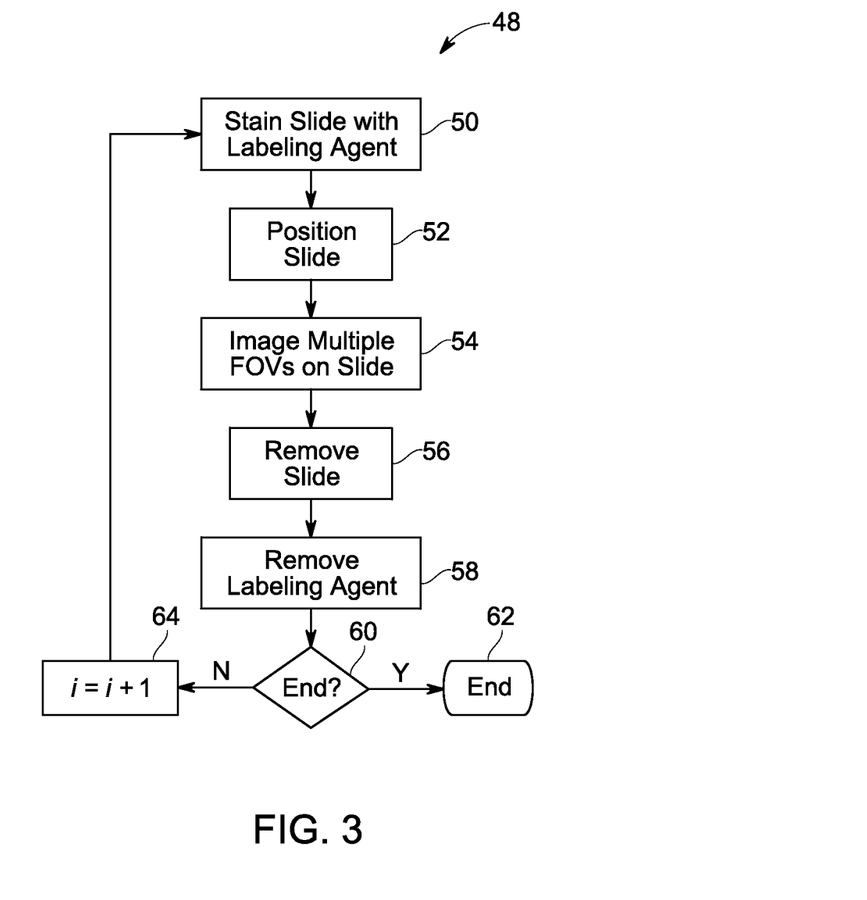
FIG. 3 depicts a flow diagram of steps associated with slide handling in an imaging protocol having multiple image acquisition rounds, in accordance with aspects of the present disclosure.

The slide 28 is then placed (block 52) on the stage 22 of the imaging system 10 and images 42 are acquired (block 54) at a plurality of different positions. In one embodiment, the acquired images 42 correspond to overlapping fields of view, such that the acquired images overlap by 5%, 10%, or some other suitable overlap region, as discussed herein. In this example, once the images 40 are acquired for the stain or stains associated with a current round of image acquisition, the slide 28 is removed (block 56) from the stage 22, a coverslip 26 (if present) is removed from the slide 28, and one or more of the stains present on the sample 24 are removed (block 58), such as by bleaching fluorescent labels from the sample. In certain implementations, a stain or agent may remain even after other stains are removed at step 58. In such implementations, the stain or agent that remains may be common to all image acquisition rounds and may be used as a common or reference stain between rounds of imaging. Further, in certain implementations, the coverslip 26 may be replaced on the slide 28 after removal of the stains (e.g., on the bleached sample) and reimaged to obtain images for autofluorescence removal.

If there are no more image acquisitions to be performed (block 60), the image acquisition process is ended (block 62). If, however, additional images 40 of the labeled sample 24 are to be acquired, the stain or stains to be used in the next round (block 64) of imaging (e.g., a different set of fluorescently labeled agents) are obtained and applied (block 50) to the sample 24. The newly labeled slide 28 is then replaced (block 52) on the stage 28 and the imaging process repeated. This image acquisition process may be repeated as many times as needed (e.g., 5, 10, 12, 15, or times or as many times as needed), to obtain the desired profile of biomarkers.

As noted above, it may be useful to automate the review and/or analysis of the images acquired is such a serial staining process. With this in mind, it may be initially useful to describe the various causes of imaging failure that may lead to an acquired image being unsuitable. By way of example, causes of imaging defects may be grouped into four major areas: misposition (either the microscope did not acquire the correct field of view, or the automated image registration failed to align the image with those in other staining rounds); focus (all or part of an image was acquired out of focus); exposure (the image was underexposed or saturated), and defective areas of the tissue (lost or damaged tissue, bubbles in the mounting media, and foreign objects in the field of view). Of these four causes, the present approach may be particularly useful in detecting image defects arising from misposition, poor focus, and defective areas of tissue.

With the foregoing comments in mind, in certain embodiments an automated approach is provided for assessing image quality. In addition, as discussed in herein, examples of tests of the present approach are discussed to facilitate explanation of the approach. With respect to the material employed in these tests, hundreds of field of view images were available for analysis where the imaging failed altogether (e.g., due to mispositioning or poor focus) or where there were area defects, such as due to tissue damage attributable to the rinsing and restaining process. In certain experiments, each field of view included one image in each staining round showing a persistent stain—one largely unaffected by the bleaching process. This image provided a view that would look substantially identical from round to round. This view provided a reference for registration. Overlaying this view from two different staining rounds in different colors provided a very rapid visual check of both image quality and registration.

In addition, with respect to sample materials, for whole-image defects, a subset of some six thousand of images from studies that were known to be problematic was examined visually, and divided into two bins: "good" (meaning that the image was in focus and correctly positioned) and "bad" (meaning that the image was out of focus or mispositioned). The images had been obtained on microscopes from two different manufacturers, and encompassed two different types of tissue that display very different visual texture (human prostate and human glioblastoma). These images served as a test set for position and focus detection, as discussed herein.

For area defects, a smaller subset of images was extracted from two rounds of staining that experienced a high defect rate. These images also were acquired on different instruments and encompassed different tissue types. They were partitioned at random into a training set of 12 images and a validation set of 60. All 72 images were scored for area defects by loading them into a painting program, and overlaying them with red color in areas that a human observer adjudged to be "defective" and black in areas that the human observer adjudged to be "background."

As disclosed herein, a system is provided to quantify the registration, focus, and area quality of acquired images. In the examples discussed, the training sets discussed above were used to provide ground truth to validate the system's performance.

Figure 4:
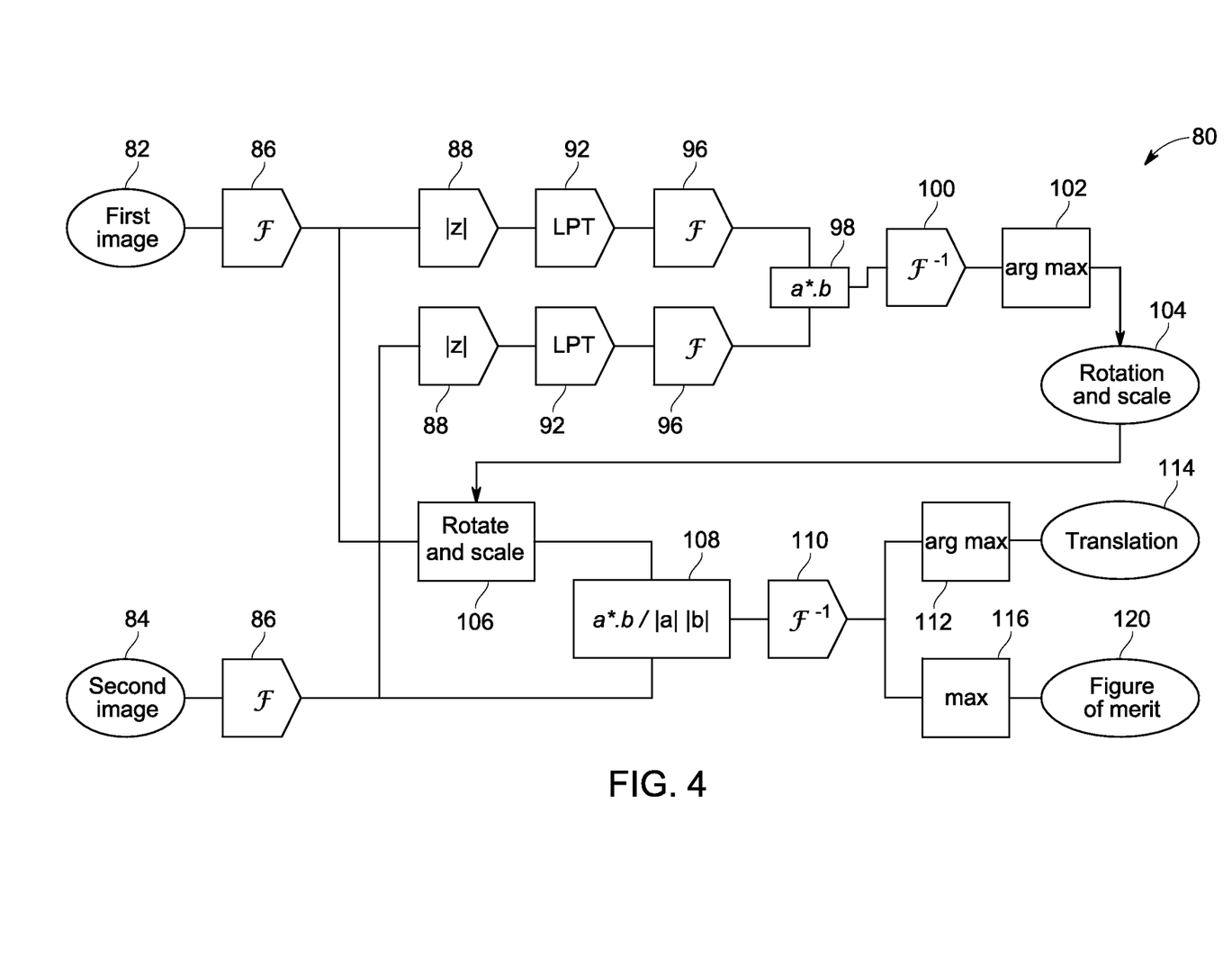
FIG. 4 depicts a flow diagram of for registration steps and derivation of translation and figure of merit, in accordance with aspects of the present disclosure.

Turning to the present algorithms used in assessing registration and focus, it will be appreciated that unregistered images acquired using a microscope (such as sequentially acquired offset images of a sample) are typically registered (i.e., aligned) too allow subsequent analysis. For example, in the serial staining context noted above, a slide containing a sample is removed from the stage for bleaching and restaining between imaging rounds. Typically the slide is not replaced in precisely the same position and orientation on the stage for each imaging round. The present algorithms register the respective field of view images and the respective images from different imaging rounds. FIG. 4 gives an overview 80 of one implementation of a contemplated registration process.

Turning to FIG. 4, a first image 82 and a second image 84 are both Fourier transformed (blocks 86). For each resulting 2-dimensional spatial frequency bin, the modulus of the spatial frequency component is extracted (blocks 88). The resulting images are translation-invariant signatures of the original images 82, 84 (that is, translation affects the phase of the frequency components, but not the amplitude). Moreover, a rotation of the original image remains a rotation in the Fourier domain, and a scaling operation on the original image becomes a scaling operation by the reciprocal of the scale factor in the Fourier domain.

Turning back to FIG. 4, a Log-Polar Transform (LPT) is performed (blocks 92) to transform the signatures into log-polar coordinates. In log-polar space, a rotation of the original image becomes a translation on the Θ axis, and a scaling by a constant factor becomes a translation on the r axis. In the depicted example, a Fourier domain correlation operation is performed: consisting of Fourier-transforming (blocks 96) both images and multiplying one by the complex conjugate of the other (block 98). The inverse Fourier transform is taken (block 100), yielding a correlation function in the r–θ plane. Locating the maximum (block 102) gives the rotation and scale factors 104 that best match the two images 82, 84.

With the rotation and scale 104 solved for and turning back to the original Fourier-transformed images, the Fourier transform of the second image is rotated and scaled (block 106) by the determined rotation and scale factors 104, and a phase correlation is performed on the Fourier transformed reference image and the rotated and scaled Fourier transform of the second image to solve for translation (block 108). An inverse Fourier transform may be performed (block 110) to return to the pixel domain. The location of the correlation peak (block 112) in the pixel domain is the amount 114 by which one image must be translated to overlay it with the other, and the height 116 of the peak (the zero-mean normalized cross-power correlation coefficient) is a figure of merit 120 for how well one image registered with the other.

With the foregoing general discussion of a suitable registration approach in mind, examples of test results are provided describing real-world implementations and results. For example, a test was performed to confirm the correlation is an effective measure of registration quality. To test such assumptions, a sample of images (six thousand images in one example) were processed in accordance with the algorithm of FIG. 4. The fraction of misregistered and badly focused images identified by a correlation less than a figure of merit threshold (i.e., the true positive rate (TPR)) and the fraction of false alarms raised on well-registered images (i.e., the false positive rate (FPR)) were calculated as the threshold of the correlation coefficient was varied from zero to unity.

Figure 5:
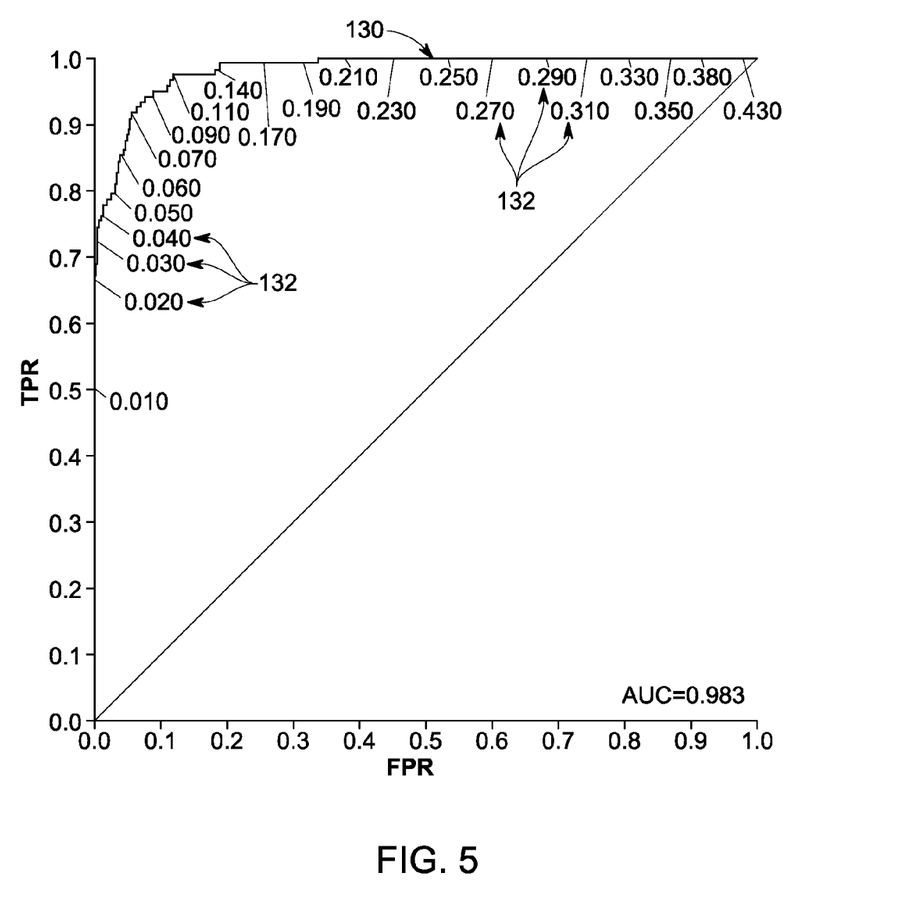
FIG. 5 depicts a receiver operating characteristic (ROC) curve for registration and focus detection, in accordance with aspects of the present disclosure.

The resulting Receiver Operating Characteristic (ROC) curve 130 is plotted in FIG. 5. As evidenced in FIG. 5, in this example the area-under curve (AUC) is better than 98%. Therefore, as described in this example, the algorithm discussed herein is capable of identifying misfocus and misregistration more than 98% of the time, depending on the figure of merit threshold 132 applied (depicted by the numerals under the curve 130). As will be appreciated, based on these results, such an analysis may be suitable for running as an unsupervised (i.e., automatic or without used oversight or intervention) check of registration quality with a fixed threshold. Further the action taken in response to the results of this analysis may also be automated. For example, failure of the registration, as determined by this automated step) may result in further attempts at registration using different parameters or approaches and/or reacquisition of one or more of the images in question if deemed advisable.

While the preceding addresses issues related to automation of the assessment of registration quality and focus detection, in addition it may be desirable to automate the detection of area defects in sequentially acquired field of view images. For example, in one embodiment an algorithm, as discussed herein, is employed to identify area defects after image registration. One implementation of such an area defect detection algorithm may be based on the premise that any defect in a single staining round (or in the baseline round) will result in an image in the persistent nuclear stain (i.e., the stain common to each imaging round to allow comparison of images acquired in different rounds) that is locally different between the current staining round and the baseline. As will be appreciated, there are other differences that can come up, such as fading of the persistent stain and local differences in illumination, but all of these other differences typically affect only the brightness or the contrast of the images, leaving the local features intact.

Accordingly, one embodiment of an area defect detection algorithm is correlation-based. In this example, the algorithm is tuned with one parameter, N, which is a measure of the length scale over which to look for local similarity. That is, for each pixel in an image, the area defect detection algorithm considers a square array of pixels having sides 2N−1 in length and centered on a given pixel. In one implementation, the algorithm computes the Pearson product moment correlation between the baseline round and the staining round for each array of pixels undergoing comparison. This correlation becomes the figure of merit for the center pixel, and a thresholding operation then sorts the pixels into "good" and "bad" or "acceptable" and "unacceptable" classifications.

With the foregoing general discussion of a suitable area defect detection approach in mind, examples of test results are provided describing real-world implementations and results. For example, a test was performed to evaluate the algorithm. In this example, the training and validation data were generated by a human observer who had painted over defective areas of images undergoing analysis. The halfwidth of the rectangular pixel array was varied from 3 to 60 pixels, and the correlation at each pixel location was computed.

Figure 6:
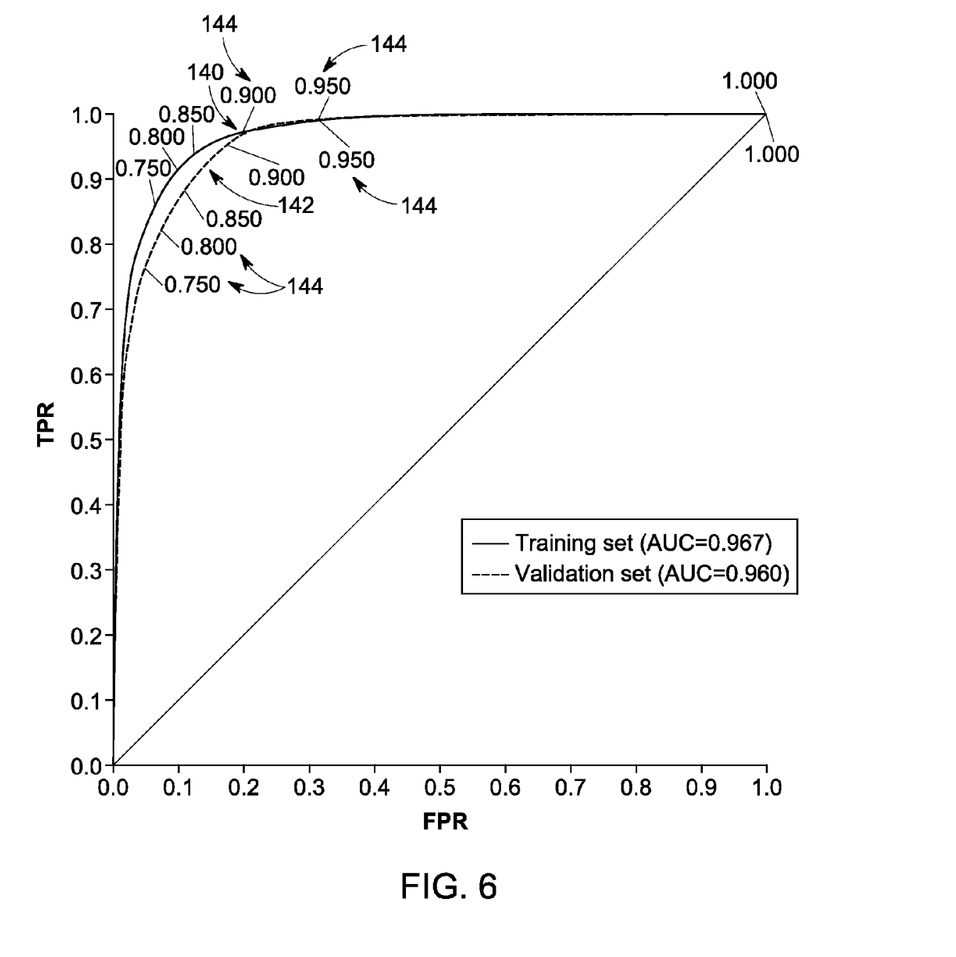
FIG. 6 depicts ROC curves for area detection, in accordance with aspects of the present disclosure.
Figure 7:
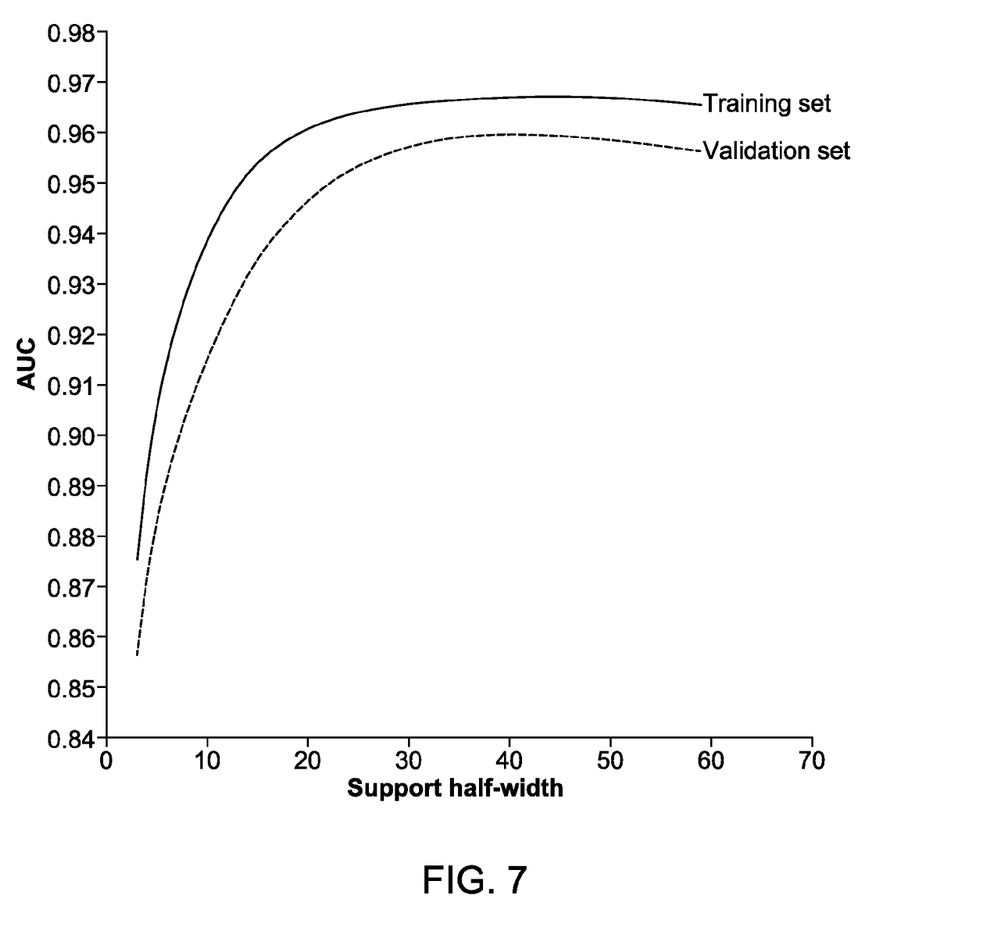
FIG. 7 depicts the area under the ROC curves of FIG. 6 as a function of the size of the array of pixels analyzed, in accordance with aspects of the present disclosure.

Receiver Operating Characteristic (ROC) curves 140, 142 (FIG. 6) were drawn, varying the threshold 144 on the figure of merit. A "true positive" was scored wherever the human observer and algorithm both marked the image as "defective", and a "true negative" wherever the observer and algorithm both marked the image as neither "defective" nor "background". "Background" pixels were ignored for the purpose of calculating ROC. Turning to FIG. 7, the area under the ROC curve was tabulated and plotted as a function of the halfwidth of the array. In these examples, an optimum size of the pixel array for analysis for area defects was determined to approximately 40 pixels (e.g. 41 pixels), though for other datasets and analyses this determination might vary. In addition, in the examples reproduced herein, it may be observed that the AUC falls off by less than one percent as the halfwidth varies by more than a factor of 3. It should be noted that the ROC curves 140, 142 reproduced in FIG. 6 are generated using the 41 pixel width determined to be suitable for the test data, as determined in FIG. 7. Turning back to FIG. 6, comparing the two ROC curves 140, 142 reveals that the figure-of-merit threshold 144 appears to affect primarily specificity. That is, points on the two curves 140, 142 with the same threshold 144 differ chiefly in their sensitivity (i.e., true positive rate).

Technical effects of the invention include the automated assessment of registration quality and focus using a figure of merit. Other technical effects include the automated detection of area defects. By way of example, in particular embodiments, registration of images may be performed using rigid-body transformations in the Fourier domain and registration and focus errors may be automatically determined using a figure of merit that was used for the registration. Further, area defects may be automatically detected in the images.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for assessing image quality, comprising:
   acquiring a first image and a second image, wherein at least a portion of the first image and the second image overlap;
   determining a rotation and a scale relating the first image and the second image;
   rotating and scaling a respective Fourier transform of the first image to correspond to a respective Fourier transform of the second image;
   determining a translation for the respective first image and the second image based upon the rotated and scaled Fourier transforms of the first image and the second image;
   determining a score quantifying the quality of the registration of the first image and the second image; and
   wherein determining the rotation and the scale comprises:
      Fourier transforming the first image and the second image to generate a respective first spatial frequency bin and second spatial frequency bin;
      extracting a first modulus from the first spatial frequency bin and a second modulus from the second spatial frequency bin to generate a first translation invariant signature and a second translation invariant signature;
      performing a log-polar transformation of the first translation invariant signature and the second translation invariant signature;
      in log-polar space, performing a Fourier domain correlation operation; and
      determining the rotation and the scale based on the result of the Fourier domain correlation operation.

2. The computer-implemented method of claim 1, wherein the first image and the second image are acquired using a microscope.

3. The computer-implemented method of claim 1, wherein the first image and the second image are acquired in different imaging rounds of a sequential staining imaging protocol.

4. The computer-implemented method of claim 1, wherein determining the translation comprises:
   performing a phase correlation on the rotated and scaled Fourier transforms of the first image and the second image to obtain the translation.

5. The computer-implemented method of claim 4, wherein performing the phase correlation comprises:
   performing an inverse Fourier transform to return the rotated and scaled Fourier transforms of the first image and the second image to the pixel domain; and
   locating a correlation peak in the pixel domain, wherein the location of the correlation peak corresponds to the translation.

6. The computer-implemented method of claim 5, wherein determining the score comprises:
   determining the height of the correlation peak, wherein the height of the correlation peak corresponds to the score.

7. The computer-implemented method of claim 6, wherein the height of the correlation peak comprises the zero-mean normalized cross-power correlation coefficient for the registered first image and second image.

8. An image analysis system, comprising:
   a memory storing one or more routines; and
   a processing component configured to execute the one or more routines stored in the memory, wherein the one or more routines, when executed by the processing component, cause acts to be performed comprising:
      acquiring or accessing a first image and a second image, wherein at least a portion of the first image and the second image overlap;
      determining a rotation and a scale relating the first image and the second image;

rotating and scaling a respective Fourier transform of the first image to correspond to a respective Fourier transform of the second image;
determining a translation for the respective first image and the second image based upon the rotated and scaled Fourier transforms of the first image and the second image; and
determining a score quantifying the quality of the registration of the first image and the second image; and
wherein determining the rotation and the scale comprises:
Fourier transforming the first image and the second image to generate a respective first spatial frequency bin and second spatial frequency bin;
extracting a first modulus from the first spatial frequency bin and a second modulus from the second spatial frequency bin to generate a first translation invariant signature and a second translation invariant signature;
performing a log-polar transformation of the first translation invariant signature and the second translation invariant signature;
in log-polar space, performing a Fourier domain correlation operation; and
determining the rotation and the scale based on the result of the Fourier domain correlation operation.

9. The image analysis system of claim 8, wherein determining the translation comprises:
performing a phase correlation on the rotated and scaled Fourier transforms of the first image and the second image to obtain the translation.

10. The image analysis system of claim 9, wherein performing the phase correlation comprises:
performing an inverse Fourier transform to return the rotated and scaled Fourier transforms of the first image and the second image to the pixel domain; and
locating a correlation peak in the pixel domain, wherein the location of the correlation peak corresponds to the translation.

11. The image analysis system of claim 10, wherein determining the score comprises:
determining the height of the correlation peak, wherein the height of the correlation peak corresponds to the score.

\* \* \* \* \*